(12) United States Patent
Danzeisen et al.

(10) Patent No.: US 9,130,804 B2
(45) Date of Patent: Sep. 8, 2015

(54) METHOD AND SYSTEM FOR TRANSMISSION OF DATA PACKETS FROM AN IP-BASED NETWORK VIA A FIRST NETWORK NODE TO A SECOND NETWORK NODE

(75) Inventors: Marc Danzeisen, Ittigen (CH); Marc Heissenbuettel, Bern (CH); Jan Linder, Bern (CH); Felix Aeschlimann, Urtenen-Schoenbuehl (CH)

(73) Assignee: Swisscom (CH)

( * ) Notice: Subject to any disclaimer, the term of this patent is extended or adjusted under 35 U.S.C. 154(b) by 544 days.

(21) Appl. No.: 11/873,174

(22) Filed: Oct. 16, 2007

(65) Prior Publication Data
US 2008/0095080 A1 Apr. 24, 2008

(30) Foreign Application Priority Data
Oct. 17, 2006 (EP) .................................... 06122426

(51) Int. Cl.
| | | |
|---|---|---|
| *H04L 29/12* | (2006.01) | |
| *H04W 8/26* | (2009.01) | |
| *H04W 28/08* | (2009.01) | |
| *H04W 28/16* | (2009.01) | |
| *H04W 80/04* | (2009.01) | |
| *H04W 88/06* | (2009.01) | |
| *H04L 29/06* | (2006.01) | |

(52) U.S. Cl.
CPC ...... *H04L 29/12009* (2013.01); *H04L 29/1233* (2013.01); *H04L 61/25* (2013.01); *H04W 8/26* (2013.01); *H04L 69/14* (2013.01); *H04L 69/24* (2013.01); *H04W 28/08* (2013.01); *H04W 28/16* (2013.01); *H04W 80/04* (2013.01); *H04W 88/06* (2013.01)

(58) Field of Classification Search
None
See application file for complete search history.

(56) References Cited

U.S. PATENT DOCUMENTS

| 5,910,951 | A | * | 6/1999 | Pearce et al. | ................... | 370/351 |
|---|---|---|---|---|---|---|
| 6,788,682 | B1 | * | 9/2004 | Kimmitt | ....................... | 370/389 |
| 6,907,469 | B1 | * | 6/2005 | Gallo et al. | .................... | 709/238 |
| 2003/0220074 | A1 | * | 11/2003 | Wee et al. | ..................... | 455/11.1 |
| 2004/0185777 | A1 | * | 9/2004 | Bryson | ......................... | 455/41.1 |
| 2005/0271032 | A1 | * | 12/2005 | Yun et al. | ...................... | 370/349 |

(Continued)

OTHER PUBLICATIONS

Chan-Wah Ng et al: "Multiple Access Interfaces for Mobile Nodes and Networks." Networks, 2004 12th IEEE International Conference on Singapore Nov. 16-19, 2004, Piscataway, NJ, USA, IEEE, US, pp. 774-779.

(Continued)

*Primary Examiner* — Jae Y Lee
*Assistant Examiner* — Tito Pham
(74) *Attorney, Agent, or Firm* — McAndrews, Held & Malloy, Ltd.

(57) ABSTRACT

The invention relates to a method and a system for transmission of data packets. On a first wireless network interface of a first communication node, a first IP address is configured for a wireless bidirectional transmission of data packets between the first communication node and an IP-based network. A second wireless local network interface of the first communication node is configured for a bidirectional transmission of data packets via a local communication link between the first communication node and a second communication node. On the second communication node a second IP address is configured which is stored assigned to an IP home address or an identifier, or at least a first IP address is stored assigned to an IP home address or an identifier.

23 Claims, 2 Drawing Sheets

(56) References Cited

U.S. PATENT DOCUMENTS

| | | | |
|---|---|---|---|
| 2006/0159065 A1* | 7/2006 | Jennings | 370/352 |
| 2006/0203804 A1* | 9/2006 | Whitmore et al. | 370/352 |
| 2007/0110080 A1* | 5/2007 | Bennett | 370/400 |
| 2007/0189408 A1* | 8/2007 | Waxman | 375/267 |
| 2007/0263559 A1* | 11/2007 | Gossain et al. | 370/328 |
| 2008/0205308 A1* | 8/2008 | Prehofer et al. | 370/310 |
| 2008/0304481 A1* | 12/2008 | Gurney et al. | 370/389 |

OTHER PUBLICATIONS

Perera E et al: "OptiNets: An Architecture to Enable Optimal Routing for Network Mobility." 2004 International Workshop on Wireless Ad-Hoc Networks, pp. 68-72.

Ernst, Thierry; Charbon, Julien: "Multihoming with NEMO Basic Support." Proceedings of the First International Conference on Mobile COmputing and Ubiquitous Netowrking (ICMU 2004), Yokosuka, Japan, 6 pgs.

* cited by examiner

METHOD AND SYSTEM FOR TRANSMISSION OF DATA PACKETS FROM AN IP-BASED NETWORK VIA A FIRST NETWORK NODE TO A SECOND NETWORK NODE

CROSS-REFERENCE TO RELATED APPLICATION

This application is based upon and claims the benefit of priority from the prior European Patent Application No. 06122426.7 filed on Oct. 17, 2006; the entire content of which is incorporated herein by reference.

TECHNICAL FIELD

This invention relates to a method and system for transmission of data packets. In particular, the invention relates to a method and a system in which on at least one first wireless network interface of a first communication node a first IP address is configured for a wireless bidirectional transmission of data packets between the first communication node and an IP-based network.

BACKGROUND ART

Electronic devices such as, for example, mobile telephones, PDAs (PDA: Personal Digital Assistant), computers, play consoles, wristwatches or navigation devices are becoming more and more widespread. By means of network interfaces that are installed on the electronic device, a communication link can be set up between the electronic device and a communication network. Thus a computer, a notebook, a fixed net telephone, a mobile telephone, a play console or any other electronic device can have network interfaces for connection to a fixed-network-based or a mobile communication network. Such network interfaces include in particular network interfaces for connection of the electronic device to a POTS (POTS: Plain Old Telephone System) network, to an Ethernet network, to a GSM (GSM: Global System for Mobile Communications) network, to a WLAN (WLAN: Wireless Local Area Network) network or to any other network. By means of such a network interface, data can be exchanged between the electronic device and further devices via a corresponding communication network. In particular, by means of such network interfaces, a communication link can be established between the electronic device and an IP-based network (IP: Internet Protocol). For instance, the availability of e-mail messages on an e-mail server can be checked with a notebook, by means of a WLAN network interface, or, by means of a console, a game move can be transmitted to a remote play console, or the clock of a computer can be synchronized with the clock of a time server.

Electronic devices can also have network interfaces for establishing wireless local communication links, however. Thus, for example, an IrDA (Infrared Data Association) interface or a Bluetooth interface for establishing a wireless local Communication link can be installed on a PDA (PDA: Personal Digital Assistant). Such a wireless network interface of a PDA is suitable, for example, to set up a wireless local communication link to a fixed-installed computer or to a notebook. Via such a wireless local communication link data can be synchronized between the PDA and the notebook. Thus synchronized between the PDA and the notebook can be, for instance, e-mail messages between e-mail applications of the PDA and of the notebook. Of course also data of further applications, such as, for instance, of a calendar or of an address book, can be synchronized between corresponding applications of the PDA and of the notebook.

A drawback of the method used in the state of the art is that the network interface installed on an electronic device for communication with a communication network has a high energy requirement, on the one hand, and, on the other hand, requires a large device size. These disadvantages are overcome with a network interface for establishing a local communication link. However, with a network interface for establishing a local communication link, communication links can be established only to devices that are in the immediate operational range of such a network interface. Communication via usual communication networks such as, for instance, a WLAN network, a GSM network or a UMTS network is not possible with such a network interface for establishing a local communication link.

Another drawback of the state of the art results from the great dispersion of electronic devices. Thus users often have a plurality of electronic devices, such as, for example, a first electronic device with a WLAN network interface, such as e.g. a PDA, and a second electronic device with a GSM network interface, such as e.g. a mobile telephone. With the second electronic device with the GSM network interface at a location where both a WLAN network and a GSM network would be available, a user can only use the GSM network. If, however, the user would like to transmit a large data file, such as a video data file, to the second electronic device, the user cannot make use of the faster WLAN network even though such a network would be available at the current location of the user.

A further drawback of the state of the art is that a user, who has a plurality of electronic devices, i.e. as just described, a first electronic device with a WLAN network interface and a second electronic device with a GSM network interface, can lose the access to a network for certain of the electronic devices during a change of location. If the user moves out of the operational range of a WLAN hotspot, for example, the user can completely lose the possibility of network access for the first electronic device with the WLAN network interface. This despite the fact that at the current location of the user a—although somewhat slower—GSM network would still be available.

DISCLOSURE OF INVENTION

It is an object of the present invention to propose a new method and a new system for transmission of data packets which do not have the drawbacks of the state of the art.

According to the invention, these objects are achieved in particular through the features of the independent claims. Further advantageous embodiments follow moreover from the dependent claims and from the specification.

In particular, these objects are achieved through the invention in that a second wireless local network interface of the first communication node is configured for a bidirectional transmission of data packets via a local communication link between the first communication node and a second communication node, a second IP address being configured on the second communication node, which address is stored assigned to an IP home address or an identifier, or the at least one first IP address being stored assigned to an IP home address or an identifier. Thus the first communication node can be designed as a bridge, for example, which bridge includes a first wireless network interface, for instance a UMTS network interface, for establishing a communication link with an IP-based network, and a second wireless local network interface, for instance a Bluetooth network interface, for establishing a wireless local communication link. In this embodiment variant, a second IP address is preferably configured on the second communication node, the second IP address being stored assigned to an IP home address or an identifier, for example according to a mobile IP standard or according to a host identification protocol. Such an embodiment variant has in particular the advantage that an IP address can be configured on a second communication node with a wireless local communication interface, such as, for example, a Bluetooth interface, on the basis of which IP address it is possible to always communicate with the second communication node with an availability of a wireless local communication link. Thus, for example, a bridge, as described, can be disposed in the buses of a bus company. The second communication node of a user, who changes from a first bus into a second bus thus has a fixed IP-based communication link, and current stock market prices, for instance, can be constantly transmitted to the second communication node of the user. In the state of the art such communication with a second communication node is known only with use of a considerably more involved wireless interface of the second communication node, such as, for instance a UMTS interface. The first communication node can also be designed, however, as a communication node with a plurality of first wireless network interfaces, for example a UMTS network interface and a WLAN network interface. Thus the first communication node can be designed in particular as a notebook with a plurality of such first wireless network interfaces. The wireless local communication link between the first communication node and the second communication node can be designed, for example, as a Bluetooth communication link. The second communication node communicates via any protocol, for instance via a Bluetooth protocol, with the first communication node, and, based on this protocol, data can be exchanged between the second communication node and the first communication node. In this embodiment variant, an IP address can be configured on the first communication node, this IP address being stored assigned to an IP home address or an identifier, for example according to a mobile IP standard or according to a host identification protocol. With such a method, constant availability of an IP-based communication link between the first communication node and an IP-based network can be ensured, this communication link being able to be continued by means of the first communication node via the wireless local communication link to the second communication node. Thus a second communication node having only a wireless local network interface, such as e.g. a Bluetooth network interface, can be provided with a constantly available communication link to an IP-based network. Such a method can be particularly advantageous for second communication devices with limited size and energy storage.

In an embodiment variant, parameters of the at least one first wireless network interface of the first communication node and/or parameters of the at least one IP-based network are transmitted via the wireless local communication link to the second communication node. Such a parameter can relate, for example, to a transmission bandwidth, to an identification of the IP-based network, to an identification of the at least one first network interface or to any other parameter. Derived from the identification of the IP-based network can be, for instance, whether communication is taking place to an IP-based network fulfilling, for example, certain quality criteria such as e.g. average bandwidth per user and/or maximal costs per time unit. Derived from the identification of the least one network interface can be, for instance, whether communication based on a GSM network, a UMTS network or a WLAN network is taking place and whether a certain degree of security of the communication is thereby ensured, for example. Such an embodiment variant has in particular the advantage that applications of the second communication node at an available network interface and/or on an available IP-based network can be adapted in that with the transmission of data packets an additional compression module or an additional encryption module can be activated, for example.

In another embodiment variant, a plurality of first wireless network interfaces of the first communication node are configured for connection to at least one IP-based network, and, by means of a load-balancing module of the first communication node, data packets are transmitted to the first wireless network interfaces. Such an embodiment variant has in particular the advantage that a highly reliable and failure-free communication link to at least one IP-based network can be established.

In an embodiment variant, a plurality of wireless local communication links are configured between the second communication node and a plurality of first communication nodes, and by means of a load-balancing module of the second communication node data packets are transmitted to the first communication node. Such an embodiment variant has in particular the advantage that the wireless local communication between the second communication node and first communication node can be established in a highly reliable and failure-free way.

In a further embodiment variant, by means of an analysis module, parameters of the plurality of first wireless network interfaces of the first communication node or respectively parameters of the plurality of local communication links are captured, and a data packet transmitted via the local communication link, or respectively a data packet to be transmitted, is analyzed by means of the analysis module in relation to the captured parameters, and, based on this analysis, at least one of the plurality of first wireless network interfaces, or respectively at least one of the plurality of wireless local communication links, is selected for transmission of the data packet to at least one IP-based network or respectively to at least one first communication node. Thus, for example, a data packet which should be transmitted over an especially secure IP-based network is transmitted via a first network interface with corresponding security features such as e.g. an encryption module, and a data packet which should be transmitted over an especially fast IP-based network is transmitted via a first network interface with corresponding performance features such as e.g. a maximal bandwidth. Such an embodiment variant has in particular the advantage that the transmission of data packets to the available first wireless network interfaces or respectively to the available wireless local communication links can be adapted according to definable criteria.

In another embodiment variant, data packets which are transmitted via the local communication link are marked with an identifying tag before the transmission, and stored on the load-balancing module is a table with identifying tags and corresponding network interfaces, and on the basis of the identifying tags and the table with identifying tags data packets are transmitted to at least one of the plurality of first wireless network interfaces. The marking of the data packets by means of an identifying tag can take place, for instance, based on application settings of the second communication node. Thus, for example, when registering with an e-mail server an e-mail client can define a first identifying tag such that an especially secure first wireless network interface is selected. On the other hand, when downloading an e-mail message the e-mail client can define the identifying tag such that an especially fast first wireless network interface is selected. Such an embodiment variant has in particular the advantage that the transmission of data packets can be optimized dynamically according to definable criteria.

In a further embodiment variant, the wireless local communication link is assigned a port number, and data packets are transmitted to the at least one IP-based network with this number as source port. Such an embodiment variant has in particular the advantage that, for example, a plurality of second communication nodes are each able to configure a local communication link to a first communication node, whereby through the indication of the source port a bidirectional communication link can be established between any IP-based communication node and the second communication nodes.

In another embodiment variant, a Bluetooth connection and/or an IrDA connection is set up as the local communication link. Of course other technologies can be used here too such as UWB (UWB: Ultra Wide Band), WLAN, USB (USB: Universal Serial Bus) or further future technologies. Such an embodiment variant has in particular the advantage that the transmission of data packets can take place by means of widespread and well known technologies.

In another embodiment variant, used as the at least one first wireless network interface of the first communication node is an HSPA-based network interface (HSPA: High Speed Packet Access), a UMTS-based network interface, an EDGE-based network interface, a GPRS-based network interface and/or a WLAN-based network interface. Such an embodiment variant has in particular the advantage that the transmission of data packets can take place by means of technologies which are widespread both in relation to the network infrastructure and to the first communication node.

BRIEF DESCRIPTION OF DRAWINGS

Embodiment variants of the present invention will be described in the following with reference to examples. The examples of the embodiments are illustrated by the following attached figures.

MODE(S) FOR CARRYING OUT THE INVENTION

Figure 1:
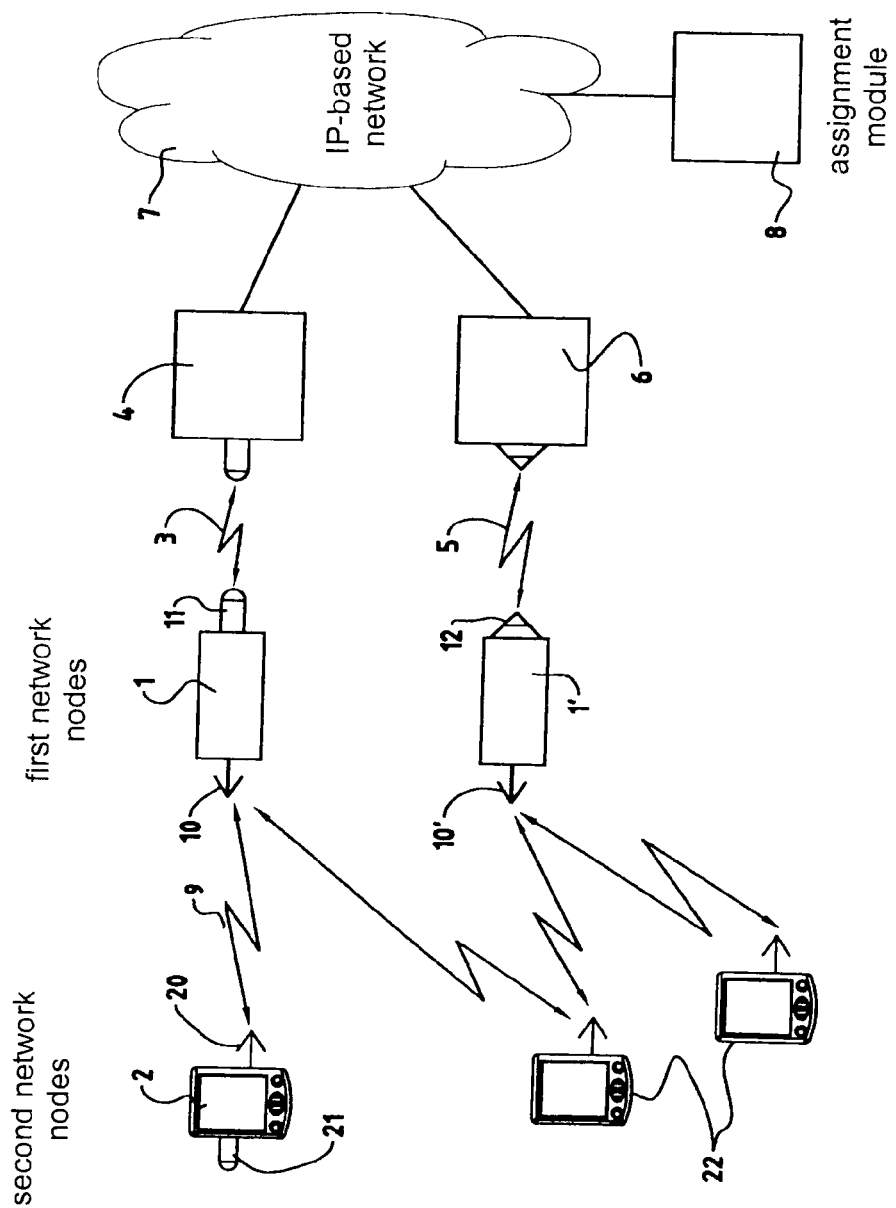
FIG. 1 shows a block diagram with the individual components of a method and system according to the invention for transmission of data packets according to a first embodiment variant.

In FIG. 1, the reference numeral 1 refers to a first communication node. The first communication node 1 can relate to a notebook, a fixed installed computer, a mobile telephone, a PDA (Personal Digital Assistant) or any other communication node. The first communication node 1 can relate in particular to a bridge or a router for connection of communication networks. As shown in FIG. 1, a plurality of instances of the first communication node can be installed. The reference numeral 1' in FIG. 1 relates to a further instance of the first communication node 1. Of course any desired number of instances of the first communication node 1 can be installed. As drawn in FIG. 1, a multiplicity of first communication nodes 1,1' can be provided. As drawn in FIG. 1, the first communication node 1,1' comprises at least one first wireless network interface 11,12 for establishing data links 3,5 to connecting stations 4,6 of an IP-based network 7. The data links 3,5 can be implemented as unidirectional, such as e.g. broadcast or as unicast uplink, data links, or as bidirectional data links. It is to be mentioned that the term IP-based network in this text refers to networks which are generally able to transport IP data packets. Such IP-based networks are not limited to those known in literature as All-IP networks, but relate to all IP-capable networks. The network interfaces 11,12 can relate to HSPA-based network interfaces (HSPA: High Speed Packet Access), to UMTS-based network interfaces (UMTS: Universal Mobile Telecommunications System), to EDGE-based network interfaces (EDGE: Enhanced Data Rates for GSM Evolution), to GPRS-based network interfaces (GPRS: General Packet Radio Service), to WLAN-based network interfaces (WLAN: Wireless Local Area Network) or to any other network interface.

In FIG. 1, the reference numerals 10,10' refer to a wireless local network interface. The wireless local network interfaces 10,10' can be implemented, for example, as IrDA network interface (IrDA: Infrared Data Access), as Bluetooth network interface, as NFC network interface (NFC: Near Field Communications), as UWB network interface (UWB: Ultra Wide Band) or as any other wireless local network interface. Such a wireless local network interface has in particular an operational range of some meters and is characterized by a very minimal energy consumption and by small space requirements. In FIG. 1 the reference numeral 2 refers to a second communication node. The second communication node 2 can relate to a PDA (Personal Digital Assistant), to a wristwatch, to a mobile telephone or to any other communication node. The second communication node 2 has a wireless local network interface 20 corresponding to the wireless local network interface 10,10'. By means of the wireless local network interfaces 10,10' of the first communication node 1,1' and the wireless local network interface 20 of the second communication node 2, a wireless or wired local communication link 9 between the second communication node 2 and the first communication node 1 can be established via a corresponding protocol, i.e. via an IrDA protocol or via a Bluetooth protocol, for instance. This can take place, for example, by means of monitoring modules installed on the communication node 1,2, which modules establish a local communication link 9 between the communication nodes 1,2 according to a corresponding protocol, as soon as the wireless local network interfaces are mutually located in the operational range. Thus the first communication node 1 can relate to a bridge which is installed in a bus. Such a bridge can comprise, for example, a UMTS network interface as wireless network interface 11, and a Bluetooth network interface as wireless local network interface 10. As soon as a user with a second communication node 2, i.e. for instance a PDA with a Bluetooth interface, boards the bus, a local communication link 9 between the bridge and the PDA can be established through corresponding monitoring modules of the bridge and of the PDA. The local communication link 9 can be implemented in particular as a layer 2 connection. Of course, based on such a layer 2 connection, any desired connection of a higher layer can be established through corresponding modules of the communication nodes 1,2, i.e. in particular an IP-based connection of a layer 3.

The first communication node 1 is connected to the IP-based network 7 via an IP-based connection by means of the wireless network interface 11. Accordingly a first IP address is configured on the wireless network interface 11. This can take place via usual methods such as, for example, according to a DHCP protocol (DHCP: Dynamic Host Configuration Protocol), according to stateful autoconfiguration of the IPv6, according to stateless autoconfiguration, in which the communication node 1 forms the first IP address by means of the MAC address and of the network address or the subnetwork address, or according to any other method. Mentioned here as an example for a configuration of an IP address is also PDP (PDP: Packet Data Protocol). IP-based communication links between the first communication node 1 and the IP-based network can thus be established by means of the first IP address.

As soon as the local communication link 9 has been established between the second communication node 2 and the first communication node 1, two different variants can come into play.

In a first variant, a second IP address is configured on the second communication node 2. As with the first IP address, this second IP address can be configured by means of corresponding methods, i.e. for instance by means of DHCP or any other method. As soon as the second IP address is configured, this second IP address can be stored assigned to an IP home address or an identifier. This can take place in particular by means of an assignment module 8 described in the following.

In a second variant, no further IP address is configured on the second communication node 2. In this case, the local communication link 9 comprises, for example, only a layer 2 protocol. By means of corresponding modules of the second communication node 2 and of the first communication node 1 it can be ensured, for example, that the second communication node acts as an application able to be run on the first communication node 1. In this case, however, the first IP address is stored assigned to an IP home address or an identifier. This can once again take place in particular by means of an assignment module 8 described in the following.

In FIG. 1, the reference numeral 8 refers to an assignment module. The assignment module 8 can comprise means of storing an IP home address or respectively an identifier assigned to an IP address. The assignment module 8 can be implemented in particular as a software module, which software module can be executed on a server connected to the IP-based network 7. Thus, an IP home address can be assigned to the first communication node 1 or to the second communication node 2, for example, and this IP home address can be stored in the assignment module 8. As soon as a first IP address is configured on one of the network interfaces 11,12 of the first communication node 1, this first IP address can be stored, assigned to the IP home address, in the assignment module 8, for example by the communication node 1. Of course as soon as a second IP address is configured on the second communication node 2, this second IP address can be stored assigned to the IP home address. The assignment module 8 can relate, for example, to a home agent, as described in the document RFC 3344 "IP Mobility Support for IPv4" (RFC: Request for Comments) of the IETF (IETF: Internet Engineering Task Force). The assignment module 8 can however also relate to a rendezvous server as described in the Internet draft "Host Identity Protocol Architecture" of the IETF. Of course the assignment module 8 can also be implemented according to another method or standard. Thus, for example, an identifier can be assigned to the second communication node and stored in the assignment module 8. After a local communication link 9 has been established between the second and the first communication node 1,2 and as soon as a connection between the first communication node 1 and the IP-based network 7 is able to be made through a configuration of a first IP address on one of the network interfaces 11,12 of the first communication node 1, the first IP address and a number of a port can be stored, for example, assigned to the identifier of the second communication node. Thus the second communication node can relate, for instance, to a wristwatch with a Bluetooth interface and the first communication node can relate to a mobile telephone with a Bluetooth interface and a GSM interface. Assigned to the wristwatch can be an identifier, for example a number consisting of a 128-bit number. As described, the first application of the first communication node 1 can be implemented such that as soon as a connection is able to be established between a second application active on the wristwatch and the first application via a local communication link 9, and as soon as an IP address can be established on one of the network interfaces 11,12 for connection to an IP-based network 7, the IP address together with a number of a port relating to the connection between the first application and the second application are stored assigned to the identifier of the wristwatch. This makes it possible to always access applications of the wristwatch by means of this 128-bit number, for example. The second application can relate, for example, an application for synchronization of the time of the wristwatch with a time server connectible to an IP-based network 7. The second application can also relate, however, to an alarm application, current alarm data from an alarm server connectible to the IP-based network 7 being loaded on the wristwatch as soon as the availability of a communication link between the alarm server and the alarm application of the wristwatch exists through correspondingly updated entries of the assignment module 8.

Figure 2:
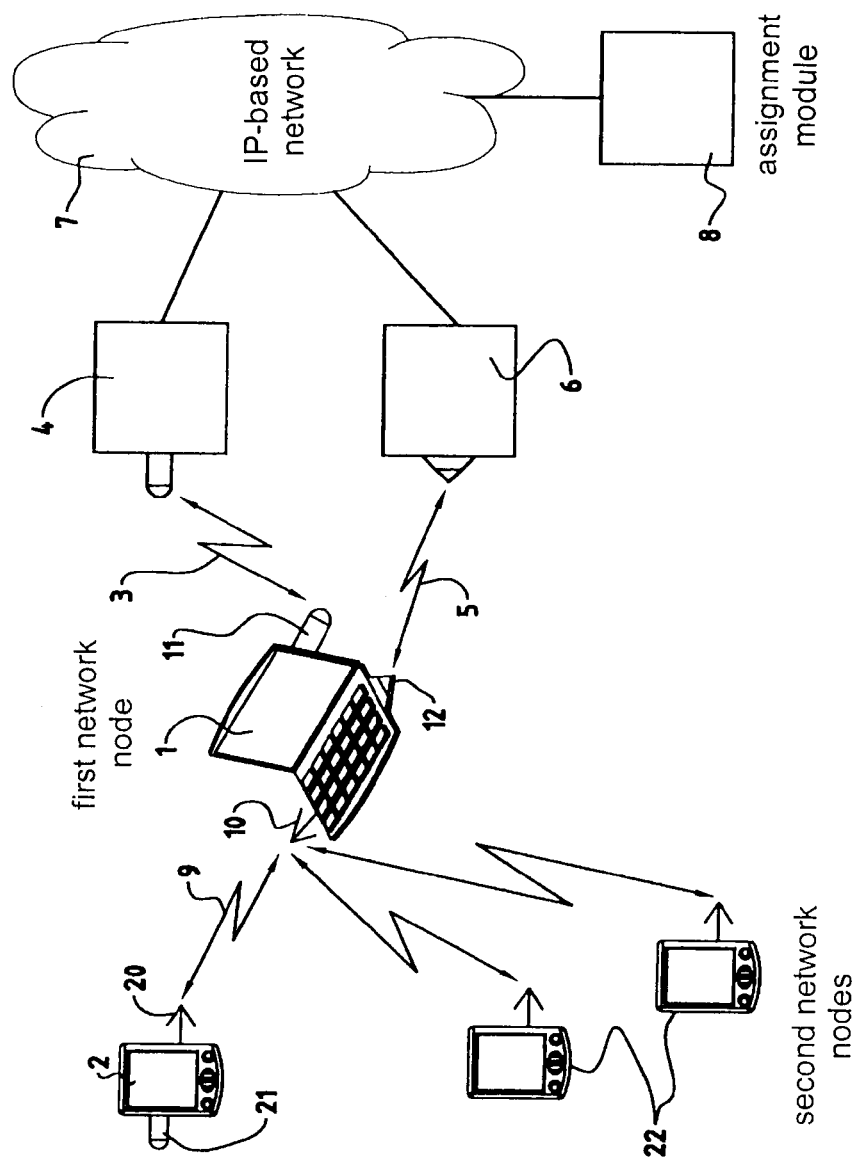
FIG. 2 shows a block diagram with the individual components of a method and system according to the invention for transmission of data packets according to a second embodiment variant.

In FIG. 2 the reference module 1 refers to a first communication node. The first communication node 1 can once again relate to a notebook, a fixed-installed computer, a mobile telephone, a PDA (Personal Digital Assistant) or any other communication node. The first communication node 1 comprises network interfaces 11,12 for establishing connections 3,5 to connecting stations 4,6 of an IP-based network 7. In a preferred embodiment variant, the first communication node 1 relates to a notebook with an installed network card with an HSPA-based network interface (HSPA: High Speed Packet Access), a UMTS-based network interface (UMTS: Universal Mobile Telecommunications System), an EDGE-based network interface (EDGE: Enhanced Data Rates for GSM Evolution), a GPRS-based network interface (GPRS: General Packet Radio Service) and/or a WLAN-based network interface (WLAN: Wireless Local Area Network). Such a network card is marketed by the company Swisscom Mobile AG under the designation "Mobile Unlimited." The connections 3,5 between the network interfaces 10,11 of the communication node 1 and the connection stations 4,6 are established by a network operator according to his specification by means of corresponding network components. Thus the connection stations 4,6 can be specified and configured such that, as soon as the communication node 1 is located in the operational range of one of the connecting stations 4,6, an IP address is configured on the corresponding network interface. Such a configuration of an IP address can take place, for example, by means of a DHCP server or by means of one of the methods described further above for configuration of an IP address on a network interface. In FIG. 2, the connections 3,5 are shown as wireless connections. However, a connection 3,5 can relate both to a wire-based connection, for instance by means of a twisted-pair Ethernet cable, as well as to a wireless connection, for example to a radio connection based on radio waves. In a corresponding way, the connecting stations 4,6 can be an Ethernet switch of an Ethernet-based network, a base station of a GSM-based network or an access point of a WLAN-based network.

In FIG. 2 the reference numeral 2 refers a second communication node. The second communication node 2 can relate to a notebook, a fixed-installed computer, a mobile telephone, a PDA (Personal Digital Assistant) or any other communication node. The second communication node 2 can also relate to an electronic device, such as, for instance, a wristwatch, a pocket calculator, a pulse measuring device or any other electronic device. The first communication node 1 and the second communication node 2 comprise local communication interfaces 10,20 for establishing a local communication link 9. Mentioned for the sake of completeness is that the second communication node can comprise a further network interface 21 or a plurality of further network interfaces. The network interface 21 can once again relate, for instance, to a network interface for connection to a base station of a GSM-based network or for connection to an access point of a WLAN-based network.

With the second communication node 2, it can be in particular a matter of an electronic device with small dimensions and small energy reserves, such as, for instance a wristwatch. Of course installed on such an electronic device can be a network interface for connection to a connecting station 4,6 and thus for connection to the network 7. However, because of the additionally needed energy reserves in particular, such a network interface would not be producible in a sufficiently miniaturized form, which would significantly limit its acceptance on the market. For example, wristwatches of the service "msn direct" offered by the Microsoft Corp. (www.msndirect.com) comprise an FM Receiver (FM: Frequency Modulation) in order to receive the latest news. However, this technology is limited to a unidirectional data transmission. Moreover, the battery of the thus equipped wristwatches has to be recharged already after a few days. On the other hand, wireless local network interfaces 10,20 for establishing a wireless local communication link 9 are able to be manufactured in the meantime in a sufficiently miniaturizable form. Such a local communication link 9 can be implemented according to the Bluetooth standard, the IrDA standard or any other standardized or non-standardized method. Provided on the communication node 1,2 are means of executing applications on this communication node 1,2. Such means can comprise in particular a microprocessor as well as corresponding logic circuitry. Thereby ensured, through further means, such as an operating system with library function able to run on the microprocessor, is that bidirectional or unidirectional data are able to be exchanged on a particular communication node between an application and the local network interface of the particular communication node. By means of the local communication link 9, data are transmittable between the second communication node 2 and the first communication node 1. Thus data can be transmitted in particular between an application of the second communication node 2 and an application of the first communication node 1.

The applications able to run on the communication nodes 1,2 can be implemented according to very interesting embodiments. In the following, an application able to be run on the first communication node 1 will be designated as the first application and an application able to be run on the second communication node 2 will be designated as the second application.

Thus, for example, the second application can comprise means of storing parameters about the network interfaces 11,12 of the first communication nodes, such as, for instance, the available network bandwidth, the configured IP address or any other parameter. The first application can be designed in such a way as to select one of the network interfaces 11,12, for example based on a parameter which is transmitted from the second application to the first application, and to transmit data which was received via the local communication link 9 from the second application to the selected network interface 11,12. Through the first application it can thereby be ensured in particular that the IP packets which are transmitted to the IP-based network 7 by means of the selected network interface 11,12, are always transmitted with the same number as source port number. In a corresponding way, IP packets which are received with the same number as destination port number, are always transmitted by the first application to the second application. Through such an embodiment of the applications data can be transmitted bidirectionally between the second application and an IP-based network, whereby through the second application a network interface 11,12 of the first communication node 1 can be selected for this transmission.

In another example, the first application can comprise means of storing the mentioned parameters about the network interfaces 11,12 of the first communication node. Thus the first application can comprise means of storing features about available network interfaces 11,12 in a lookup-table. The second application can simply transmit data about the local communication link 9 to the first application, it being possible for means to be provided on the first application of analyzing these data in particular with reference to the lookup table, whereby, based on such an analysis, one or more of the network interfaces 11,12 being selected and the data being transmitted by the first application to one or more network interfaces 11,12.

The invention claimed is:

1. A method of transmitting data packets over an IP-based network, comprising:
    capturing parameters associated with a plurality of network interfaces of a first communication node;
    analyzing, using the captured parameters, a data packet that is received or to be transmitted;
    selecting based on analysis of the data packet, a first wireless network interface of the first communication node and a second wireless network interface of the first communication node;
    configuring a first IP address for a first communication between the IP-based network and the first wireless network interface of the first communication node running a first application, the first communication configured to perform a wireless bi-directional transmission of data packets between the first communication node and the IP-based network over the first wireless network interface;
    setting up the second wireless network interface using a layer 2 protocol between the first communication node and a second communication node running a second application, for bi-directional data transmission of data packets between the first communication node and the second communication node;
    receiving an identifier for the second communication node, at the first communication node, without receiving an IP address for the second communication node; wherein the identifier is associated with the first IP address together with a number of a port of the first wireless network interface; and
    communicating data packets between the second communication node and the IP-based network via the first communication node.

2. The method of transmitting data packets according to claim 1, comprising transmitting at least one of a plurality of parameters of the first wireless network interface of the first communication node, or parameters of the IP-based network via the second wireless network communication interface to the second communication node, by an application module.

3. The method of transmitting data packets according to claim 1, comprising connecting the first wireless network interface of the first communication node to the IP-based network; and transmitting data packets from the first wireless network interface of the first communication node to the IP-based network, by using a load-balancing module of the first communication node.

4. The method of transmitting data packets according to claim 1, comprising configuring the second wireless network interface between the second communication node and the first communication node; and
transmitting data packets from the second communication node to the first communication node via the second wireless network interface by using a load-balancing module of the second communication node.

5. The method of transmitting data packets according to claim 4, comprising marking data packets that are configured to be transmitted via the second wireless network communication interface with an identification tag before transmission over the second wireless network interface;
looking up a corresponding first wireless network interface that is associated with the identification tag in a table of the load balancing module of the second communication node; and
transmitting data packets to the first network interface based on said step of looking up the corresponding first wireless network interface.

6. The method of transmitting data packets according to claim 1, comprising transmitting data packets over the second wireless network communication interface via the first communication node to the IP-based network with the port number as a source port.

7. The method of transmitting data packets according to claim 1, wherein the second wireless network communication interface includes at least one of a Bluetooth interface or an IrDA interface.

8. The method of transmitting data packets according to claim 1, wherein the first network interface of the first communication node include at least one of a HSPA-based network interface, a UMTS-based network interface, an EDGE-based network interface, a GPRS-based network interface, or a WLAN-based network interface.

9. The method of transmitting data packets according to claim 1, comprising configuring a second IP address for bidirectional communication between the IP-based network and a third wireless network interface of the first communication node.

10. The method of transmitting data packets according to claim 9, comprising sending at least one network parameter for the first wireless network interface and sending at least one network parameter for the third wireless network interface to the second application over the second wireless network interface.

11. The method of transmitting data packets according to claim 10, wherein the first application decides whether the step of transmitting the data packets is performed by the first wireless network interface or the third wireless network interface based on the at least one network parameter for the first wireless network interface and the at least one network parameter for the second wireless network interface.

12. A system for transmitting data packets over an IP-based network, the system comprising:
a first communication node that is configured to:
capture parameters associated with a plurality of network interfaces of the first communication node; and
analyze, using the captured parameters, a data packet that is received or to be transmitted, to enable selecting based on the analysis of the data packet, a first wireless network interface of the first communication node and a second wireless network interface of the first communication node;
wherein a first IP address is configured for a first communication between the IP-based network and the first network interface of the first communication node that runs a first application, for performing a wireless bi-directional transmission of data packets between the first communication node and the IP-based network over the first wireless network interface;
wherein the second wireless network interface is set up using a layer 2 protocol between the first communication node and a second communication node running a second application, for bi-directional data transmission of data packets between the first communication node and the second communication node;
wherein an identifier is received for the second communication node, at the first communication node, without receiving an IP address for the second communication node, and the identifier is associated with the first IP address together with a number of a port of the first wireless network interface; and
wherein the first communication node is configured to communicate data packets between the second communication node and the IP-based network.

13. The system for transmitting data packets according to claim 12, wherein an application module configured to transmit at least one of parameters of the first wireless network interface of the first communication node or parameters of the IP-based network via the second wireless network interface to the second communication node.

14. The system for transmitting data packets according to claim 13,
wherein the application module is configured to mark data packets that are configured to be transmitted via the second wireless network communication interface with an identification tag before transmission over the second wireless network interface;
to look up a corresponding first wireless network interface that is associated with an identification tag in a table of the load balancing module; and
to transmit data packets to the corresponding first wireless network interface based on said looking up in the table corresponding to the first wireless network interface.

15. The system for transmitting data packets according to claim 13, wherein the application module is configured to transmit data packets over the second wireless network communication interface to the IP-based network with the port number as a source port.

16. The system for transmitting data packets according to claim 12, comprising a load balancing module, located at the first communication node, configured to connect the first wireless network interface of the first communication node to the IP-based network; and
to transmit data packets from the first wireless network interface of the first communication node to the IP-based network.

17. The system for transmitting data packets according to claim 12,
a load balancing module, located at the second communication node, configured to connect the second wireless network interface to the first communication node;
wherein the load-balancing module is configured to transmit data packets from the second communication node to the first communication node via the second wireless network interface.

18. The system for transmitting data packets according to claim 12, wherein the second wireless network communication interface includes at least one of a Bluetooth interface or an IrDA interface.

19. The system for transmitting data packets according to claim 12,
wherein the first network interface of the first communication node include at least one of a HSPA-based network interface, a UMTS-based network interface, an EDGE-based network interface, a GPRS-based network interface, or a WLAN-based network interface.

20. The system for transmitting data packets according to claim 12, wherein the first communication node comprises a third wireless network interface, and a second IP address is assigned for a wireless bidirectional transmission of data packets between the first communication node and the IP-based network over the third wireless network interface.

21. The system for transmitting data packets according to claim 20, wherein the first application sends at least one network parameter for the first wireless network interface and at least one network parameter for the third wireless network interface to the second application over the second wireless network interface.

22. The system for transmitting data packets according to the claim 21, wherein the first application decides whether the wireless bidirectional transmission of data packets between the first communication node and the IP-based network is done over the first wireless network interface or the third wireless network interface based on the at least one network parameter for the first wireless network interface and the at least one network parameter for the third wireless network interface.

23. A method of transmitting data packets over an IP-based network, comprising:
capturing parameters associated with a plurality of network interfaces of a first communication node;
selecting based on the captured parameters, a first wireless network interface of the first communication node and a second wireless network interface of the first communication node;
configuring a first IP address for a first communication between the IP-based network and the first wireless network interface of the first communication node running a first application, the first communication configured to perform a wireless bi-directional transmission of data packets between the first communication node and the IP-based network over the first wireless network interface;
setting up the second wireless network interface using a layer 2 protocol between the first communication node and a second communication node running a second application, for bi-directional data transmission of data packets between the first communication node and the second communication node;
receiving an identifier for the second communication node, at the first communication node, without receiving an IP address for the second communication node; wherein the identifier is associated with the first IP address together with a number of a port of the first wireless network interface;
communicating data packets between the second communication node and the IP-based network via the first communication node;
configuring the second wireless network interface between the second communication node and the first communication node;
transmitting data packets from the second communication node to the first communication node via the second wireless network interface by using a load-balancing module of the second communication node;
marking data packets that are configured to be transmitted via the second wireless network communication interface with an identification tag before transmission over the second wireless network interface;
looking up a corresponding first wireless network interface that is associated with the identification tag in a table of the load balancing module of the second communication node; and
transmitting data packets to the first network interface based on said step of looking up the corresponding first wireless network interface.

* * * * *